United States Patent [19]
Khaleghi et al.

[11] Patent Number: 6,040,933
[45] Date of Patent: Mar. 21, 2000

[54] METHOD AND APPARATUS FOR CHANNEL EQUALIZATION IN WAVELENGTH DIVISION MULTIPLEXED SYSTEMS

[75] Inventors: Farideh Khaleghi, Ottawa; Alan Glen Solheim, Kanata; Chris Wilhelm Barnard, Ottawa, all of Canada

[73] Assignee: Nortel Networks Corporation, Montreal, Canada

[21] Appl. No.: 08/994,761

[22] Filed: Dec. 19, 1997

[51] Int. Cl.$^7$ .............................. H04B 14/00; H04B 10/08
[52] U.S. Cl. .......................... 359/124; 359/133; 359/110; 359/161; 359/187
[58] Field of Search ..................................... 359/124, 133, 359/110, 161, 187

[56] References Cited

U.S. PATENT DOCUMENTS

| | | | |
|---|---|---|---|
| 5,225,922 | 7/1993 | Chraplyvy et al. | 359/124 |
| 5,745,275 | 4/1998 | Giles et al. | 359/187 |

*Primary Examiner*—Jason Chan
*Assistant Examiner*—Agustin Bello
*Attorney, Agent, or Firm*—Dallas F. Smith

[57] ABSTRACT

A method and apparatus for channel performance equalization in wavelength division multiplexed (WDM) systems is disclosed. Performance of the channels is estimated from optical power measurements of each signal transmitted by the channels. The measurements are taken at the inputs of optical amplifiers in the transmission path of the system. The channels are equalized by adjusting the optical power of the channel transmitters. The method is applicable to point-to-point networks as well as more complex network configurations such as those having an add-drop multiplexer (ADM) for inserting and extracting channels from the transmission path. The method can compensate for signals having different bit rates by applying an offset to the amount of optical power adjustment of the channel transmitters. Furthermore, if different types of optical amplifiers are used in the transmission path, the method can accommodate different noise characteristics of the amplifiers by using their noise figures in determining the amount of optical power adjustment of the transmitters that is required to equalize channel performance.

13 Claims, 4 Drawing Sheets

METHOD AND APPARATUS FOR CHANNEL EQUALIZATION IN WAVELENGTH DIVISION MULTIPLEXED SYSTEMS

FIELD OF THE INVENTION

This invention relates to optical transmission systems and more particularly to channel performance equalization in wavelength division multiplexed systems.

BACKGROUND OF THE INVENTION

Wavelength division multiplexing (WDM) is a technique employed in high capacity optical transmission networks to increase their information carrying capacity. WDM systems transmit a plurality of channels, each at a different wavelength, over a single optical fiber. Typically, a WDM system comprises N optical transmitters for optically transmitting N channels of information, a wavelength multiplexer for combining the N channels on one optical fiber, optical amplifiers connected in series by optical fiber cable, a wavelength demultiplexer for separating the optical signal into N channels, and N receivers for detecting the information carried by the N channels. In network configurations having an add-drop multiplexer, the multiplexer is located at a position along the path of the serially connected amplifiers. The add-drop multiplexer is capable of extracting a channel from the network for directing it to an alternative receiver and may also insert into the network a new channel transmitted at the same wavelength as the extracted channel.

Performance of WDM systems is related to the optical signal to noise ratio (OSNR) at the receiver. Due to wavelength dependent gain profiles, noise profiles and saturation characteristics of the optical amplifiers and wavelength dependent gain of other components in the optical path, channel OSNR values at the receiver will be unequal for equal transmitter optical power levels.

In U.S. Pat. No. 5,225,922 Chraplyvy et al disclose a method of equalizing channel performance in point-to-point WDM systems using the optical power level of each channel transmitter and the OSNR measured at each channel receiver. New transmitter optical power levels for each channel are calculated from the optical power level and OSNR values using a specified formula. The channel transmitters are then set to the new optical power levels. This process is repeated until the difference between the channel OSNRs is within a predetermined range. Although this method can equalize the OSNR at the receivers within a few iterations, it requires the use of expensive instruments such as an optical spectrum analyzer to measure the OSNRs at the receivers. A further disadvantage of this method is that it is not easily adaptable to more complex optical network configurations such as those having an add-drop multiplexer.

It appears that it would be advantageous to provide a less expensive and more flexible method of equalizing channel performance in WDM systems that is capable of equalizing performance in more complex networks such as those having an add-drop multiplexer.

SUMMARY OF THE INVENTION

It is an object of the present invention to provide improved method and apparatus for channel equalization in WDM systems that reduce or overcome some or all of the disadvantages of the techniques described above.

In accordance with one aspect of present invention there is provided a method of equalizing the performance of a first channel transmitting a first signal from a first transmitter along a first transmission path with respect to the performance a second channel transmitting a second signal from a second transmitter along a second transmission path, the equalization being effective at a predetermined location in an optical wavelength division multiplexed system and the location being downstream of an optical amplifier in the first path and downstream of an optical amplifier in the second path, the method comprising the steps of measuring the optical power of the first signal and the second signal at the inputs of each optical amplifier that is upstream of said location, and adjusting the optical power of the first transmitter by an amount dependent upon the sum of the reciprocal of the first signal optical power measurements relative to the sum of the reciprocal of the second signal optical power measurements.

An advantage of this aspect of the invention is that it provides a method for equalizing channels at a chosen location in a WDM system based on signal optical power measurements which may be taken with less expensive measurement apparatus than those used for channel equalization in known methods. Another advantage is that the method may be used for equalizing channel performance in a WDM system having a complex network configuration such as one having an add-drop multiplexer. Furthermore, the method may be performed dynamically and may therefore be responsive to changes in channel performance that could for example be due to changes in the WDM system caused by fault conditions or by network reconfiguration.

Conveniently the step of adjusting the optical power of the first transmitter includes first adding an offset to the amount of transmitter adjustment to obtain a resultant amount of transmitter adjustment and then adjusting the optical power of the first transmitter by the resultant amount, the offset being dependent upon the difference between the bit rate of the first signal and the second signal. Applying an offset to the amount of transmitter adjustment in this way has the advantage of providing better channel equalization by compensating for different noise bandwidths resulting from different bit rates of the signals.

Conveniently the step of adjusting the optical power of the first transmitter includes predefining a noise figure for each of the optical amplifiers and adjusting the first transmitter by an amount in dependence upon the sum of the reciprocal products of the noise figure and the respective optical power measurement for each optical amplifier along the paths. Predefining a noise figure for each of the optical amplifiers has the advantage of providing better channel equalization by compensating for different noise characteristics of the optical amplifiers along the transmission paths of the signals being equalized.

In accordance with another aspect of the present invention there is provided an apparatus for equalizing the performance of a first channel transmitting a first signal from a first transmitter along a first transmission path with respect to the performance a second channel transmitting a second signal from a second transmitter along a second transmission path, the equalization being effective at a predetermined location in an optical wavelength division multiplexed system and the location being downstream of an optical amplifier in the first path and downstream of an optical amplifier in the second path, the apparatus comprising a receiving means for receiving optical power measurements of said signals taken at the inputs of each optical amplifier that is upstream of said location, a storing means for storing the optical power measurements, a calculating means for calculating an amount of transmitter optical power adjustment of the first transmitter from the optical power measurements and a communicating means for communicating the amount of transmitter optical power adjustment to the first transmitter.

BRIEF DESCRIPTION OF DRAWINGS

The invention will be further understood from the following description with reference to the attached drawings wherein.

DETAILED DESCRIPTION OF THE INVENTION

Figure 1:
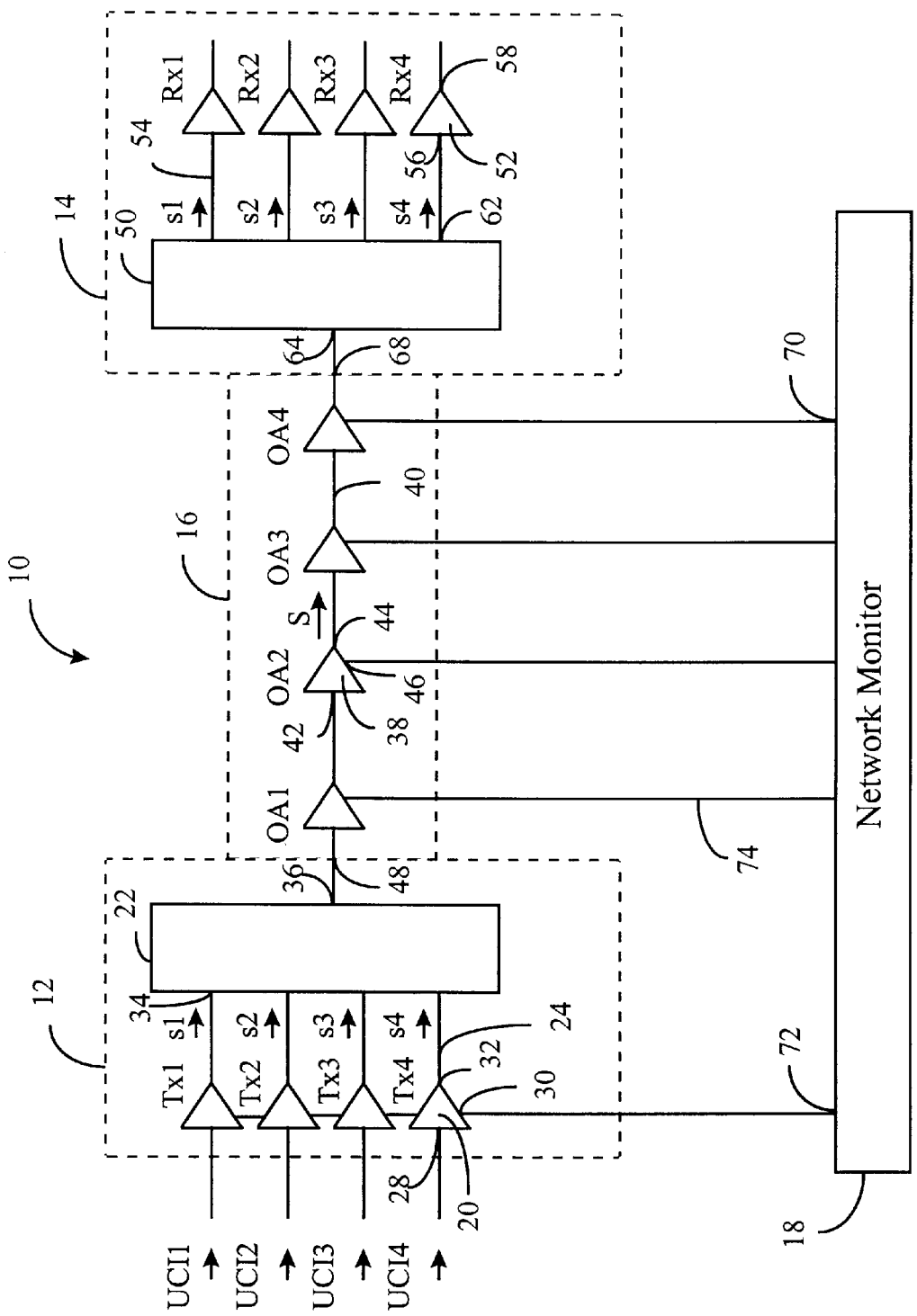
FIG. 1 is a block diagram of a WDM system in accordance with an embodiment of the present invention.

FIG. 1 is a block diagram of a WDM system 10 according to an embodiment of the present invention. The WDM system comprises a transmitter terminal 12, a receiver terminal 14, a transmission path 16 and a network monitor 18. The transmitter terminal 12 comprises four optical transmitters 20, a wavelength multiplexer 22 and optical fibers 24. Each transmitter 20 has an input 28, an output 32 and control input 30 for controlling the optical power of the output 32. The wavelength multiplexer 22 has inputs 34 and an output 36. Each transmitter output 32 is connected to a respective wavelength multiplexer input 34 by an optical fiber 24. The wavelength multiplexer output 36 is connected to transmission path 16 by optical fiber 48. The transmission path 16 comprises optical amplifiers 38 and optical fiber cable 40. Each optical amplifier 38 has an input 42, an output 44 and a data output 46 for providing a measurement of the optical signal power at the input 42. The optical amplifiers 38 are serially connected by optical fiber cable 40. The receiver terminal 14 comprises a wavelength demultiplexer 50, four optical receivers 52 and optical fiber 54. The wavelength demultiplexer 50 has an input 64 and outputs 62. Each optical receiver 52 has an input 56 and an output 58. Each receiver input 56 is connected to a respective wavelength demultiplexer output 62 by an optical fiber 54. The wavelength demultiplexer input 64 is connected to transmission path 16 by optical fiber 68. The network monitor 18 has inputs 70 and an output 72. Each network monitor input 70 is connected to a respective optical amplifier data output 46 by network links 74. The network monitor output 72 is connected to optical transmitter control inputs 30.

Figure 2:
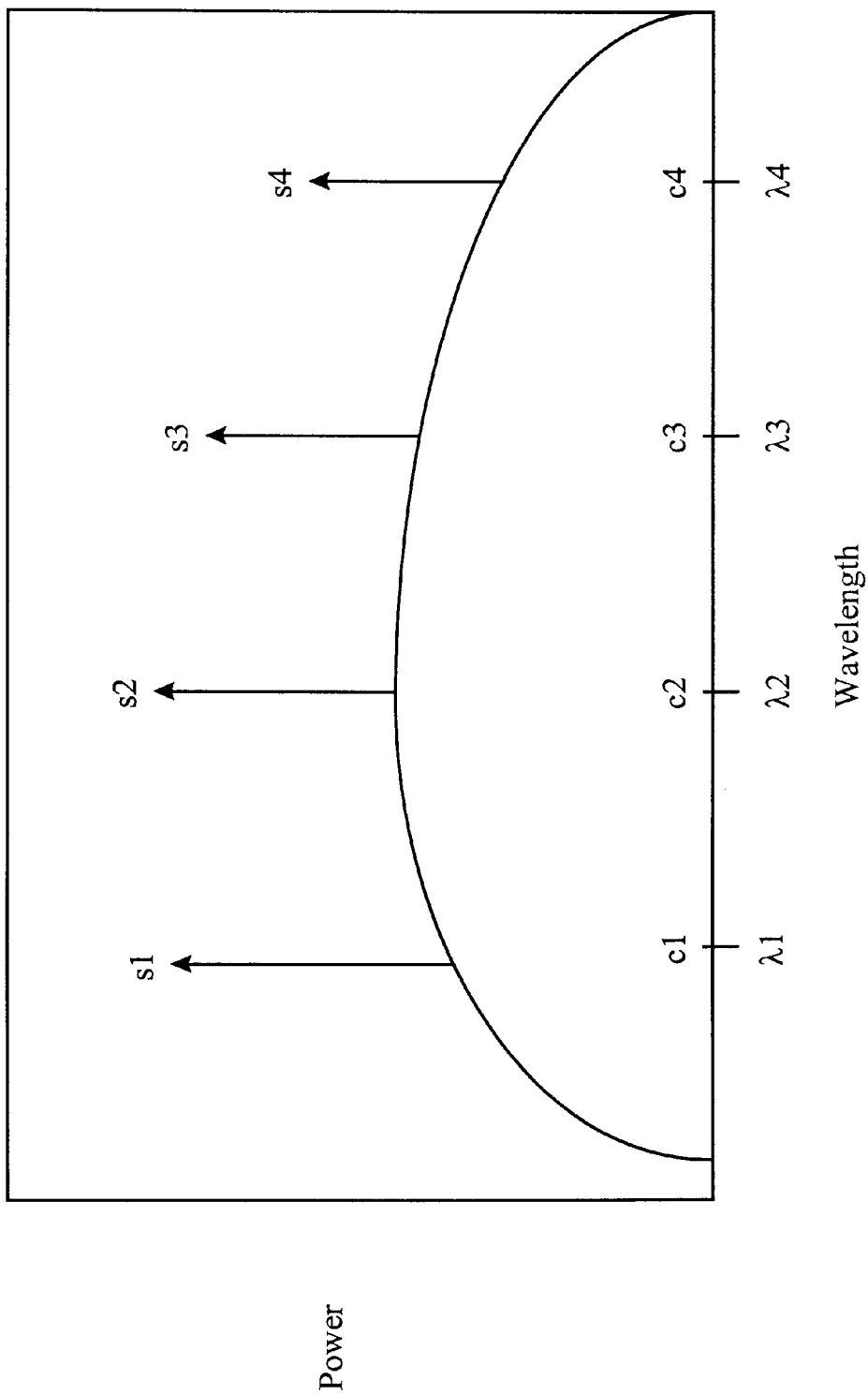
FIG. 2 is a graph of an example of the optical spectrum at the receiver terminal of FIG. 1

In operation, information signals UCI1 to UCI4 are applied to inputs 28 of optical transmitters 20. The optical transmitters 20 output optical signals s1 to s4 which are light of wavelength λ1 to λ4 modulated by information signals UCI1 to UCI4 respectively. Wavelengths λ1 to λ4 correspond to channels c1 to c4 respectively. FIG. 2 is a graph of the optical spectrum at the wavelength demultiplexer input 64 showing channels c1 to c4 at wavelengths λ1 to λ4 respectively. The wavelength multiplexer 22 combines the optical signals s1 to s4 applied to the multiplexer inputs 34 and outputs a combined optical signal S at the multiplexer output 36. Combined signal S is transmitted to the receiver terminal 14 by transmission path 16. Each optical amplifier 38 amplifies the signal applied to its input 42 by an amount of gain which is dependent upon wavelength and provides a signal to its output 44 whereby the optical power of the output signal equals the gain times the optical power of the input signal. Since the amount of gain is dependent upon wavelength, each channel of combined optical signal S is amplified by a different amount of gain. FIG. 2 shows the unequal optical power levels of signals s1 to s4 at the wavelength demultiplexer input 64 for equal optical power levels output by the transmitters 20.

Examples of optical amplifiers are semiconductor optical amplifiers and rare earth doped fiber amplifiers. Optical amplifiers add noise to the system, typically in the form of amplified spontaneous emission (ASE), so that the optical signal to noise ratio (OSNR) is degraded at each amplifier site. The OSNR is defined as the ratio of signal optical power to the ASE noise power in a reference optical bandwidth. Almost all optical amplifiers exhibit a nonuniform wavelength dependent gain profile, noise profile, and saturation characteristics. These characteristics along with wavelength dependent loss of other components in the system results in unequal OSNRs of the channels for equal transmitter optical power levels.

Bit error rate (BER) is a typical performance parameter for digital transmission systems such as optical WDM systems. BER can be determined for each channel in a transmission system and is typically related to OSNR for optical transmission systems. The BER of the channels may be equalized by adjusting the optical power level of the transmitters such that OSNRs at the receiver terminal are equalized. However, if the signals transmitted by their respective channels have different bit rates, signal qualities, or amounts of distortion, then these factors should be taken into account in combination with the OSNRs as part of the equalization process.

The method of equalizing the performance of the channels at the wavelength demultiplexer input 64 includes the steps of measuring the optical power of the signals s1 to s4 at the optical amplifier inputs 42, estimating the relative BER performance of the channels at the wavelength demultiplexer input 64, and adjusting the optical power of the transmitters 20 to equalize the performance. In order to estimate the BER performance, the noise figures (F) for each amplifier 38 in the transmission path 16 must be known whereby noise figure $F^i$ corresponds to the amount of noise, such as ASE noise, generated by an amplifier at the ith channel wavelength. The BER performance of a channel operating at wavelength λi is related to the OSNR of the channel which can be estimated from:

$$OSNR(\lambda i) = \frac{1}{hvBo\left(\sum_{j=1}^{M} \frac{1}{F_j^i P_j^i}\right)} \quad \text{EQ. 1}$$

where j is taken over all optical amplifiers in the transmission path 16, Bo is the optical bandwidth on which the OSNR is to be estimated, hv is the photon energy at wavelength λi, $P_j^i$ is the optical power of the signal transmitted over the ith channel measured at the input of the jth amplifier, and $F_j^i$ is the noise figure of the jth amplifier at channel i. To equalize the BER performance of the channels relative to any one of the channels selected as the reference channel (ref), the optical power of the transmitters are adjusted whereby the amount of adjustment (Xi) in decibels (dB) of the ith transmitter is calculated from the equation:

$$X_i = 10 \, LOG_{10} \left( \frac{\sum_{j=1}^{M} \frac{1}{F_j^{ref} P_j^{ref}}}{\sum_{j=1}^{M} \frac{1}{F_j^i P_j^i}} \right) \quad \text{EQ. 2}$$

where j is taken over all optical amplifiers in the transmission path 16.

It should be recognized that it is not necessary to estimate the OSNRs to equalize the channels since it is EQ. 2 that is used to calculate the amount of transmitter optical power adjustment that is required to equalize the performance of the channels. Therefore the method of equalizing the performance of the channels at the receiver inputs 56 need only include the steps of measuring the optical power of the signals s1 to s4 at the optical amplifier inputs 42, and adjusting the optical power of the transmitters 20 to equalize the performance of the channels whereby the amount of adjustment is calculated from EQ. 2.

Furthermore, it should be recognized that if the amplifier noise figures (F) are constant over all channel wavelengths and over all amplifiers, which is typically a good approximation for channels spaced closely in wavelength and for similar amplifiers, then the noise figures $F_j^i$ can be factored out of EQ. 2. The amount of transmitter optical power adjustment is then dependent upon the sum of the reciprocal of the signal optical power measurements taken over the transmission path of the signal relative to the sum of the reciprocal of the reference channel signal optical power measurements taken over the transmission path of the reference channel signal. Therefore the method of equalizing the performance of the channels at the wavelength demultiplexer input 64 need only include the steps of measuring the optical power of the signals s1 to s4 at the optical amplifier inputs 42, and adjusting the optical power of the transmitters 20 to equalize the performance of the channels whereby the amount of adjustment is dependent upon the sum of the reciprocal of the signal optical power measurements relative to the sum of the reciprocal of the reference signal optical power measurements.

The method of equalizing the performance of the channels has been described so far with regard to equalizing the performance at the wavelength demultiplexer input 64. However, the method can be used to equalize two or more channels relative to one another at any location in the transmission path of the channels that is downstream of an optical amplifier 38 in the transmission path. In that case, optical power measurements of the signals are taken at the inputs 42 of the optical amplifiers 38 that are upstream of the location where performance is to be equalized and the transmitters are adjusted using the optical power measurements in accordance with the previously described method. Furthermore even if one channel is transmitted over a path that has sections of the path that are physically separate from the other path, the performance of the channels can be equalized at a location that is physically common to both paths by using the described method. The location at which the equalization of performance is to be effective must be downstream of an amplifier in one path and downstream of an amplifier in the other path. The optical power measurements of the signals are taken at the inputs 42 of the optical amplifiers 38 that are upstream of the location where performance is to be equalized and the transmitters are adjusted using the optical power measurements in accordance with the previously described method. Moreover, the method can be performed dynamically and can therefore be responsive to changes in channel performance that could for example be due to changes in the WDM system caused by fault conditions or by network reconfiguration.

As mentioned earlier, if the signals transmitted by their respective channels have different bit rates, then a bit rate dependent offset should be used when adjusting the optical power of the transmitters of those channels for the purpose of equalizing channel performance. For example, if signal s1 operates at twice the bit rate of signal s2, then signal s1 will have a noise bandwidth approximately equal to twice the noise bandwidth of s2. Since BER depends on the square root of the noise bandwidth, signal s1 would require an OSNR about 1.5 dB higher than signal s2 to have an equal BER performance. The amount of bit rate dependent offset (Y) to be added to a transmitter adjustment (X) calculated from EQ. 2, for adjusting the transmitter of signal s1 at channel c1 to equalize its channel performance relative to a reference a channel c2 carrying a signal s2 of bit rate different than signal s1, is calculated from EQ. 3.

$$Y = 10 \, LOG_{10} \left[ \left( \frac{\text{bit rate of } s1}{\text{bit rate of } s2} \right)^{1/2} \right] \quad \text{EQ. 3}$$

Therefore, if channels carry signals of different bit rates then the method of equalizing the performance of the channels includes the step of first adding an offset that is dependent upon the bit rate of the channel signal relative to the bit rate of the reference channel signal to the transmitter optical power adjustment calculated from EQ. 2 to obtain a resultant amount (Z) of transmitter optical power adjustment. The resultant amount (Z) of transmitter optical power adjustment is calculated from the equation:

$$Z = X + Y \quad \text{EQ. 4}$$

where Z is given in decibels, X is calculated from EQ. 2 and Y is calculated from EQ. 3.

The method of equalizing the channels includes repeating the aforementioned steps of the method until the transmitter adjustment amount calculated from EQ. 2, and in combination with the offset calculated from EQ. 3 when applicable, is less than a predetermined amount. For example, the amount of adjustment could be the minimum adjustment amount of the transmitter optical power.

Figure 3:
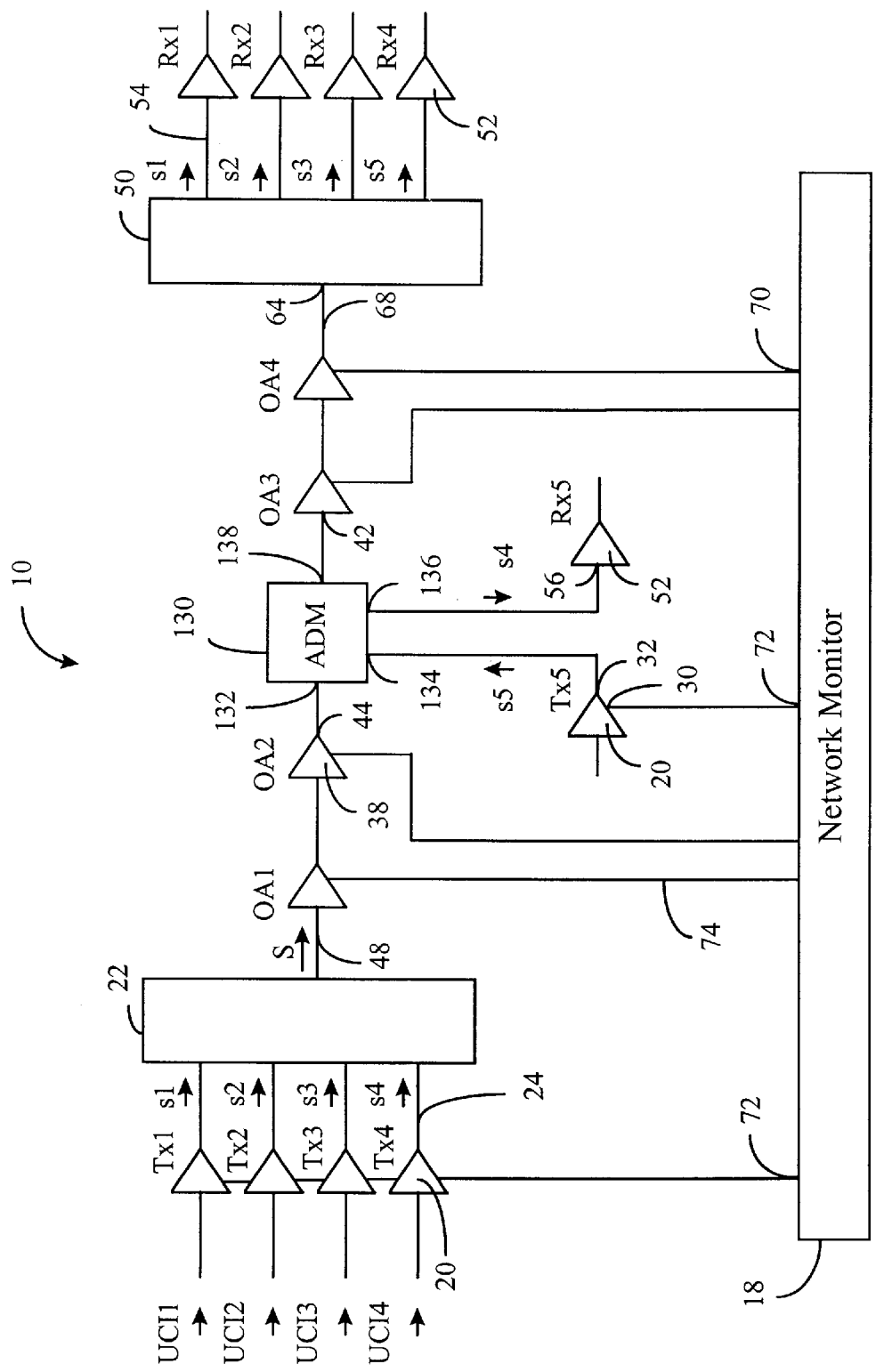
FIG. 3 is a block diagram of a WDM system with an add-drop multiplexer in accordance with another embodiment of the present invention.

FIG. 3 is a block diagram of a WDM system that includes an add-drop multiplexer (ADM) 130. The ADM 130 has optical inputs 132 and 134, and optical outputs 136 and 138. Input 132 is connected to the output 44 of an optical amplifier 38 labelled as OA2. ADM output 136 is connected to the input 56 of an optical receiver 52 labelled as Rx5. The ADM input 134 is connected to the output 32 of an optical transmitter 20 labelled as Tx5. The output 138 of ADM 130 is connected to the input 42 of an optical amplifier 38 labelled as OA3. The control input 30 of the optical transmitter Tx5 is connected to an output 72 of the network monitor 18.

Referring to FIG. 3, in operation the ADM 130 extracts channel c4, transmitting signal s4, from the network and directs it to an alternative receiver Rx5. The ADM 130, inserts a new signal s5 into the WDM system at a channel wavelength λ4 which is the same wavelength as the extracted channel c4. The performance of the channels can be equalized at the wavelength demultiplexer input 64 in accordance with the method previously described wherein the optical power of signal s5 is measured at the inputs 42 of optical amplifiers OA3 and OA4 and the optical power of signals s1, s2 and s3 are measured at the inputs 42 of amplifiers OA1 to OA4. The performance of the channels are equalized by using EQ. 2, and in combination with EQ. 3 in the case of unequal bit rates, to calculate the amount of transmitter adjustment necessary to equalize each channel relative to a reference channel, the reference channel being any channel chosen from channels c1 to c4. The performance of inserted channel c4 is equalized by adjusting the optical power of transmitter Tx5. The amount of adjustment to transmitter Tx5 is dependent upon the optical power measurements made on signal s5 at the inputs 42 of amplifiers OA3 and OA4. Optical amplifiers OA3 and OA4 are upstream of the wavelength demultiplexer input 64 which is the location in the transmission path where the performance of channels c1 to c4 is to be equalized. The performance of channels c1, c2 and c3 are equalized relative to channel c4 by adjusting the optical power of transmitters Tx1, Tx2 and Tx3 respectively. The transmitters Tx1 to Tx3 are adjusted in dependence upon the optical power measurements made on signals s1 to s3 at the inputs 42 of optical amplifiers OA1 to OA4. Optical amplifiers OA1 to OA4 are upstream of the wavelength demultiplexer input 64 which is the location in the transmission path where the performance of channels c1 to c4 is to be equalized. Therefore the method of equalizing the performance of channels in a WDM system having an add-drop multiplexer includes the step of adjusting the optical power of the transmitters of the channels by an amount dependent upon the optical power measurements of the signals taken at the inputs of the optical amplifiers along the respective transmission paths of the signals.

Figure 4:
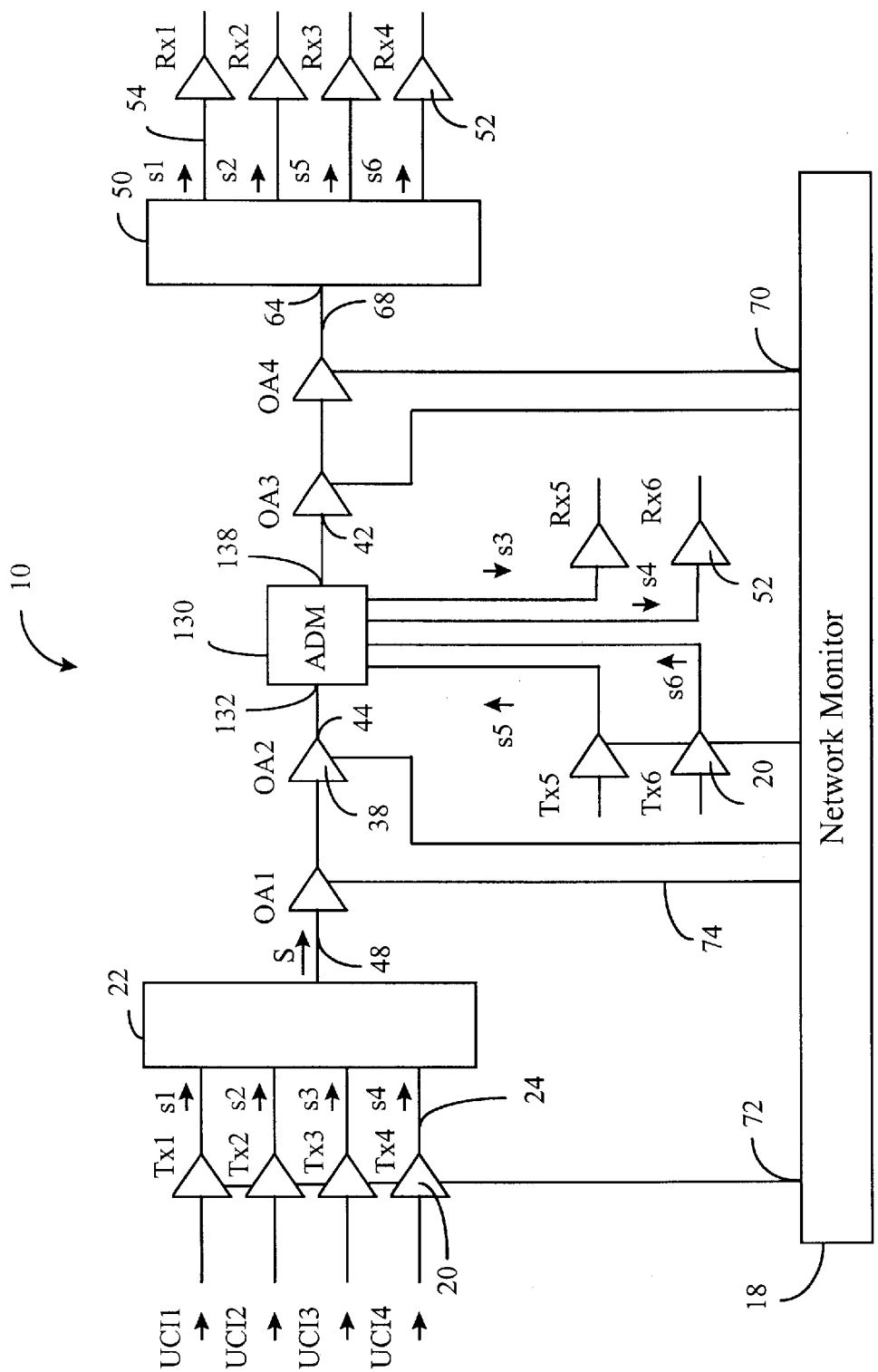
FIG. 4. is a block diagram of a WDM system with an alternate add-drop multiplexer configuration in accordance with another embodiment of the present invention.

FIG. 4 illustrates a WDM system with an ADM 130 that extracts two channels c3 and c4, transmitting signals s3 and s4 respectively, and directs them to two receivers Rx5 and Rx6. The method of equalizing the performance of the channels c3 and c4 at the inputs of receivers Rx5 and Rx6 includes adjusting the optical power of transmitters Tx3 and Tx4 from optical power measurements of signals s3 and s4 made at the inputs of optical amplifiers OA1 and OA2. The amount of adjustment to transmitters Tx3 and Tx4 is calculated using EQ. 2, and in combination with EQ. 3 when applicable as previously described. Referring again to FIG. 4, there is shown two signals s5 and s6 inserted by the ADM 130 at channel wavelengths $\lambda 3$ and $\lambda 4$ corresponding to channels c3 and c4. The performance of inserted channels c3 and c4 can be equalized with respect to each other and the performance of channels c1 and c2 at the wavelength demultiplexer input 64 in accordance with the previously described method. The method of equalizing the performance of the channels c1 to c4 includes the step of adjusting the optical power of transmitters, Tx1, Tx2, Tx5 and Tx6, by an amount dependent upon the optical power measurements of signals s1, s2, s5 and s6 taken at the inputs of the optical amplifiers in the respective transmission paths of the signals. Specifically, the amount of optical power adjustment for transmitters Tx1 and Tx2 is calculated from EQ. 2, and in combination with EQ. 3 when applicable, using optical power measurements of signals s1 and s2 taken at the inputs 42 of amplifiers OA1 to OA4. The amount of optical power adjustment for transmitters Tx5 and Tx6 is calculated in the same way from optical power measurements of signals s5 and s6 taken at the inputs 42 of amplifiers OA3 and OA4. The reference channel for equalizing the performance of channels c1 to c4 may be any one of channels c1 to c4.

With reference to FIG. 1, the network monitor 18 in the WDM system 10 provides the means for equalizing performance of channels in a WDM system according to the previously described method. The optical power measurements of signals s1 to s4 at inputs 42 of the optical amplifiers 38 are transmitted to the network monitor 18 over data links 74 to network monitor inputs 70. The network monitor 18 has a receiving means for receiving the optical power measurements and a storing means for storing the optical power measurements. The network monitor 18 has a calculating means for calculating OSNRs of the channels at the wavelength demultiplexer input 64 using EQ. 1 and the stored optical power measurements. The network monitor 18 has an adjustment calculating means for calculating the amount of adjustment to the optical power of transmitters Tx1 to Tx4 using EQ. 2, and in combination with EQ. 3 in case of different bit rates. The network monitor may have a selection means for selecting a reference channel for the purpose of calculating the optical power adjustments of the transmitters 20, or alternatively the reference channel may be predetermined. The network monitor has a communicating means for communicating the transmitter optical power adjustments to the transmitters 20. The transmitter optical power adjustments are communicated from the output 72 of the network monitor 18, through the data link 74 to the data input 30 of the transmitters 20. The network monitor may also have a repeating means for repeating the steps of receiving and storing the optical power measurements, calculating transmitter optical power adjustments, and communicating the adjustments to the transmitters 20 until the calculated optical power adjustments are less than the minimum optical power adjustment amount of the transmitters 20, or some other predetermined amount. With reference to FIG. 3 and the corresponding method previously described, the adjustment calculating means includes a means for calculating transmitter optical power adjustments for equalizing the performance of a channel inserted by an add-drop multiplexer into the WDM system relative to another channel in the system. With reference to FIG. 4 and the corresponding method previously described, the adjustment calculating means includes a means for calculating transmitter optical power adjustments for equalizing the performance of channels extracted by an add-drop multiplexer relative to one another.

Other embodiments are possible and changes may be made to the disclosed embodiments without departing from the scope of the invention. The detailed description provided does not limit the invention, instead, the scope of the invention is defined only by the appended claims.

What is claimed is:

1. A method of equalizing performance of a first channel transmitting a first signal from a first transmitter along a first transmission path with respect to performance of a second channel transmitting a second signal from a second transmitter along a second transmission path the equalization being effective at a predetermined location in an optical wavelength division multiplexed system and the location being downstream of an optical amplifier in the first path and downstream of an optical amplifier in the second path, the method comprising:

measuring the optical power of the first signal and the second signal at the inputs of each optical amplifier that is upstream of said location; and adjusting the optical power of the first transmitter by an amount dependent upon the sum of the reciprocal of the first signal optical power measurements relative to the sum of the reciprocal of the second signal optical power measurements.

2. A method as defined in claim 1, wherein the step of adjusting the optical power of the first transmitter comprises first adding an offset to said amount of transmitter adjustment to obtain a resultant amount of transmitter adjustment and then adjusting the optical power of the first transmitter by the resultant amount, said offset being dependent upon the difference between the bit rate of the first signal and the second signal.

3. A method as defined in claim 1, wherein the step of adjusting the optical power of the first transmitter comprises:

predefining a noise figure for each said optical amplifier; and adjusting the first transmitter by an amount in dependence upon the sum of the reciprocal products of the noise figure and the respective signal optical power measurement taken at each optical amplifier along said paths.

4. A method as defined in claim 1, wherein the method comprises repeating the steps defined in claim 1 until said amount of transmitter adjustment is less than a predetermined amount.

5. A method as defined in claim 2, wherein the step of adjusting the optical power of the first transmitter comprises:

predefining a noise figure for each said optical amplifier; and adjusting the optical power of the first transmitter in dependence upon the sum of the reciprocal products of the noise figure and the respective signal optical power measurement taken at each optical amplifier along said paths.

6. A method as defined in claim 5, wherein the method comprises repeating the steps defined in claim 5 until the resultant amount of transmitter optical power adjustment is less than a predetermined amount.

7. A method as defined in claim 6, wherein said amount of transmitter adjustment is calculated from the equation:

$$X = 10 \, \text{LOG}_{10} \left( \frac{\sum_{k=1}^{M} \frac{1}{F_k^2 P_k^2}}{\sum_{j=1}^{M} \frac{1}{F_j^1 P_j^1}} \right)$$

where j corresponds to the jth optical amplifier of M optical amplifiers upstream of said location in the transmission path of the first signal, $F^1_j$ is the noise figure of the jth optical amplifier upstream of said location in the transmission path of the first signal, $P^1_j$ is the optical power of the first signal measured at the input of the jth optical amplifier upstream of said location in the transmission path of the first signal, k corresponds to the kth optical amplifier of N optical amplifiers upstream of said location in the transmission path of the second signal, $F^2_k$ is the noise figure of the kth optical amplifier upstream of said location in the transmission path of the second signal, $P^2_k$ is the optical power of the second signal measured at the input of the kth optical amplifier upstream of said location in the transmission path of the second signal.

8. A method as defined in claim 7, wherein said offset is calculated from the equation:

$$Y = 10 \, \text{LOG}_{10} \left[ \left( \frac{\text{bit rate of } s1}{\text{bit rate of } s2} \right)^{1/2} \right].$$

9. An apparatus for equalizing performance of a first channel transmitting a first signal from a first transmitter along a first transmission path with respect to performance of a second channel transmitting a second signal from a second transmitter along a second transmission path the equalization being effective at a predetermined location in an optical wavelength division multiplexed system and the location being downstream of an optical amplifier in the first path and downstream of an optical amplifier in the second path the apparatus comprising:

a receiving means for receiving optical power measurements of said signals taken at the inputs of each optical amplifier that is upstream of said location;

a storing means for storing said optical power measurements;

a calculating means for calculating an amount of transmitter optical power adjustment of the first transmitter from the optical power measurements;

a communicating means for communicating the amount of transmitter optical power adjustment to the first transmitter; and an offset calculating means for calculating an offset to be added to the amount of transmitter optical power adjustment to obtain a resultant amount of transmitter adjustment for adjusting the optical power of the first transmitter, said offset being dependent upon the difference between the bit rate of the first signal and the second signal.

10. An apparatus as defined in claim 9, comprising a repeating means for repeating the steps of receiving and storing the optical power measurements, calculating the amount of transmitter optical power adjustment, calculating the offset to be added to the amount of transmitter optical power adjustment and communicating the resultant amount of transmitter optical power adjustment to the first transmitter, until the resultant amount of transmitter optical power adjustment is less than a predetermined amount.

11. An apparatus as defined in claim 10, wherein the calculating means comprises a means for calculating the amount of transmitter optical power adjustment when the first channel is one that has been inserted by an add-drop multiplexer into the wavelength division multiplex system.

12. An apparatus as defined in claim 11, wherein the calculating means comprises a means for calculating the amount of transmitter optical power adjustment for equalizing the performance of said channels relative to one another when said channels are ones that have been extracted from the optical wavelength division multiplex system by an add-drop multiplexer.

13. An apparatus as defined in claim 12, comprising a selection means for selecting the second channel.

* * * * *